(12) United States Patent
Wada et al.

(10) Patent No.: US 6,941,773 B2
(45) Date of Patent: Sep. 13, 2005

(54) APPARATUS FOR MANUFACTURING AN OPTICAL FIBER SOOT, AND METHOD FOR MANUFACTURING AN OPTICAL FIBER SOOT USING THEREOF

(75) Inventors: Hiroyuki Wada, Tokyo (JP); Kiyoshi Arima, Tokyo (JP); Masahide Kuwabara, Tokyo (JP); Sadayuki Toda, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 413 days.

(21) Appl. No.: 09/964,623

(22) Filed: Sep. 28, 2001

(65) Prior Publication Data

US 2002/0162363 A1 Nov. 7, 2002

(30) Foreign Application Priority Data

May 2, 2001 (JP) .................................... 2001-135612

(51) Int. Cl.$^7$ ............................................... C03B 37/018
(52) U.S. Cl. .............................. 65/414; 65/530; 65/531; 65/532
(58) Field of Search .......................... 65/414, 415, 421, 65/529, 530, 531, 532

(56) References Cited

U.S. PATENT DOCUMENTS 6,321,573 B1 * 11/2001 Fritsche et al. ............... 65/421
6,698,249 B1 * 3/2004 Yagi et al. ..................... 65/414

\* cited by examiner

*Primary Examiner*—Peter Chin
(74) *Attorney, Agent, or Firm*—Oblon, Spivak, McClelland, Maier & Neustadt, P.C.

(57) ABSTRACT

An apparatus for manufacturing an optical fiber soot, which comprises a core partition having an opening portion at core burner side provided on a periphery of a core burner, in a reactor of the apparatus to be used in a conventional VAD method.

10 Claims, 6 Drawing Sheets

APPARATUS FOR MANUFACTURING AN OPTICAL FIBER SOOT, AND METHOD FOR MANUFACTURING AN OPTICAL FIBER SOOT USING THEREOF

FIELD

The present invention relates to an apparatus for manufacturing a core soot in a step for manufacturing an porous optical fiber soot according to a VAD method, and to a method for manufacturing of a core soot using the apparatus.

BACKGROUND

According to the conventional VAD method (vapor-phase axial deposition method), known as a means for manufacturing a quartz optical fiber preform, glass forming(glass synthesizing) is carried out by a vapor phase reaction of a metal halide in an oxyhydrogen flame, and the thus-generated glass fine particles are deposited on the periphery of a target member, to obtain an optical fiber soot. The target member is pulled up in an axial direction, while the distance between a position of the tip of a soot and a core burner is made constant. The rate for pulling the soot up is referred to as the growth rate. After that, a glass porous soot, which is manufactured in this manner, is sintered, to give a transparent preform, by a high-temperature heat treatment, and then the preform is processed into an optical fiber by drawing or the like.

In manufacturing an optical fiber soot by these methods, the target member and the burner are contained in a reactor, so that the glass fine particles, generated in the flame of the burner, are adhered to the surface of the target member evenly and efficiently, and that the flow of air is regulated by the covering reactor.

An apparatus for manufacturing an optical fiber soot, which has been used in this method, is configured as shown in FIG. 7(a) and FIG. 7(b). FIG. 7(a) is a schematic front view of the apparatus for manufacturing the optical fiber soot, and FIG. 7(b) is a side view of FIG. 7(a), viewed from the direction of an arrowhead A. As shown in FIG. 7(a) and FIG. 7(b), a reactor 12 is provided with multiple tubes of a core burner 1 and a clad burner 2. Then, by injecting a silicon tetrachloride gas in oxyhydrogen flames (core flame) 3, which flame is generated from the core burner, and silicon dioxide fine particles are formed by a flame hydrolytic reaction. The resultant particles are deposited, in the longitudinal direction, onto a pilot bar 4, to obtain a porous soot 5. In this case, if a small amount of addictive, such as germanium tetrachloride, phosphoryl chloride, or boron bromide is injected together with silicon tetrachloride gas in the flame, fine particles composed, for example, of germanium dioxide are synchronously generated with silicon dioxide fine-particles, so that it is possible to manufacture a porous soot having a predetermined distribution of germanium dioxide or the like in the radius direction of the porous soot.

According to a manufacturing process of the optical fiber soot by using the conventional VAD method, as shown in FIGS. 7(a) and 7(b), in order to evenly and efficiently deposit the glass fine particles, and to prevent the reactor from being over-heated and the glass from being deposited to the wall of the reactor, the glass fine particles are deposited onto the pilot bar, by rotating and pulling up the optical fiber soot in a regulated airflow, such as horizontal gas flow 6 and an air curtain flow 7, which flow from air inlets 14 and 15 on the burner side, to an air-discharging pipe 11, and a descending gas flow 8, or the like. The air inlet 14 represents an air inlet for the horizontal gas flow, and the air inlet 15 represents an air inlet for the air curtain flow. Additionally, as shown in FIGS. 7(a) and 7(b), the temperature of the soot is controlled by monitoring the surface temperature of the soot, using a thermos viewer 9, during synthesis of the glass. Further, in the same way, the temperature of the tip of the soot, which is important for growth of the soot, is also controlled by monitoring with a radiation thermometer 10.

However, in order to manufacture more homogeneous optical fiber soot and to improve productivity of optical fiber soot, in forming the soot during the horizontal gas flow and the descending gas flow, it was found that the following problems were involved.

a) As is shown by arrows in FIGS. 8(a) and 8(b), ascending gas flow, generated from the core flame and the clad flame, is pushed down by the descending gas flow. Thus a turbulent descending airflow is caused. The descending airflow falls on the bottom surface and the side surface of the reactor, and then generates an ascending airflow. The degree of the flicker of the core flame is increased by the ascending airflow, so that the rate of glass growth is made instable. As a result, the thus-obtained optical fiber soot lacks uniformity in a diameter of the longitudinal direction.

b) Since the degree of the flicker of the core flame is so large, the temperature of the tip of the soot becomes inconstant. Therefore, the soot density at the tip portion of the soot is lowered, and cracks occur easily on the soot.

SUMMARY

The present invention is an apparatus for manufacturing an optical fiber soot comprising a core partition provided on a periphery of a core burner, in a reactor to be used in a VAD method.

Further, the present invention is a method for manufacturing an optical fiber soot, which method comprising using the apparatus for manufacturing an optical fiber soot.

Other and further features, and advantages of the invention will appear more fully from the following description, taken in connection with the accompanying drawings.

BRIEF DESCRIPTION OF THE DRAWINGS

FIG. 1(a) is a view seen from the front side of the apparatus for manufacturing and FIG. 1(b) is a schematic view of a core partition portion of the apparatus for manufacturing (a position of soot tip 5a is also shown in the figures. Similarly 5a is shown in other figures).

FIG. 2(a) is a view seen from the front side of the apparatus for manufacturing and FIG. 2(b) is a schematic view of a core partition portion of the apparatus for manufacturing.

FIG. 7(a) is a view seen from the front side of the conventional apparatus for manufacturing and FIG. 7(b) is a view of FIG. 7(a) seen from a direction of an arrowhead A.

FIG. 8(a) is a view seen from front side of this apparatus and FIG. 8(b) is a view seen from bottom side of this apparatus.

DETAILED DESCRIPTION

The inventors of the present invention have studied keenly to solve the above problems in the conventional technique. As a result, we have found that a barrier with a predetermined height (herein, which barrier is referred to as a core partition) is provided in a reactor of the apparatus to be used in a VAD method on the periphery of the core burner so as not to contact with the core flame and the soot, so that it is possible to prevent the airflow from irregularly flowing into the core flame by the influence of the horizontal gas flow and the descending gas flow and it is possible to rectify the turbulence of the airflow in the reactor. The inventors further confirmed that the core partition is effective in preventing the flicker of the core flame. The present invention has been developed on the basis of this discovery.

Accordingly, according to the present invention there are provided the following means:
(1) An apparatus for manufacturing an optical fiber soot comprising a core partition provided on a periphery of a core burner, in a reactor of the apparatus to be used in a VAD method.
(2) The apparatus according to the above (1), wherein the core partition has an opening portion at a core burner side.
(3) The apparatus according to the above (1) or (2), wherein the core partition at least has a height that is same as a position of a core burner nozzle, the core partition has a cylindrical shape having a diameter not less than the diameter of a porous soot, the core partition is provided below the porous soot, and a bottom of the core partition contacts a bottom surface of the reactor.
(4) The apparatus according to the above (1), (2) or (3), wherein the width of the opening portion of the core partition is smaller than the width of the core partition itself.
(5) The apparatus according to any one of the above (1) to (4), wherein the core partition rectifies the airflow in the reactor.
(6) A method for manufacturing an optical fiber soot, comprising using the apparatus for manufacturing an optical fiber soot according to any one of the above (1) to (5).

Preferred embodiments of an apparatus for manufacturing an optical fiber soot according to the present invention will be explained with reference to the drawings.

Figure 1:
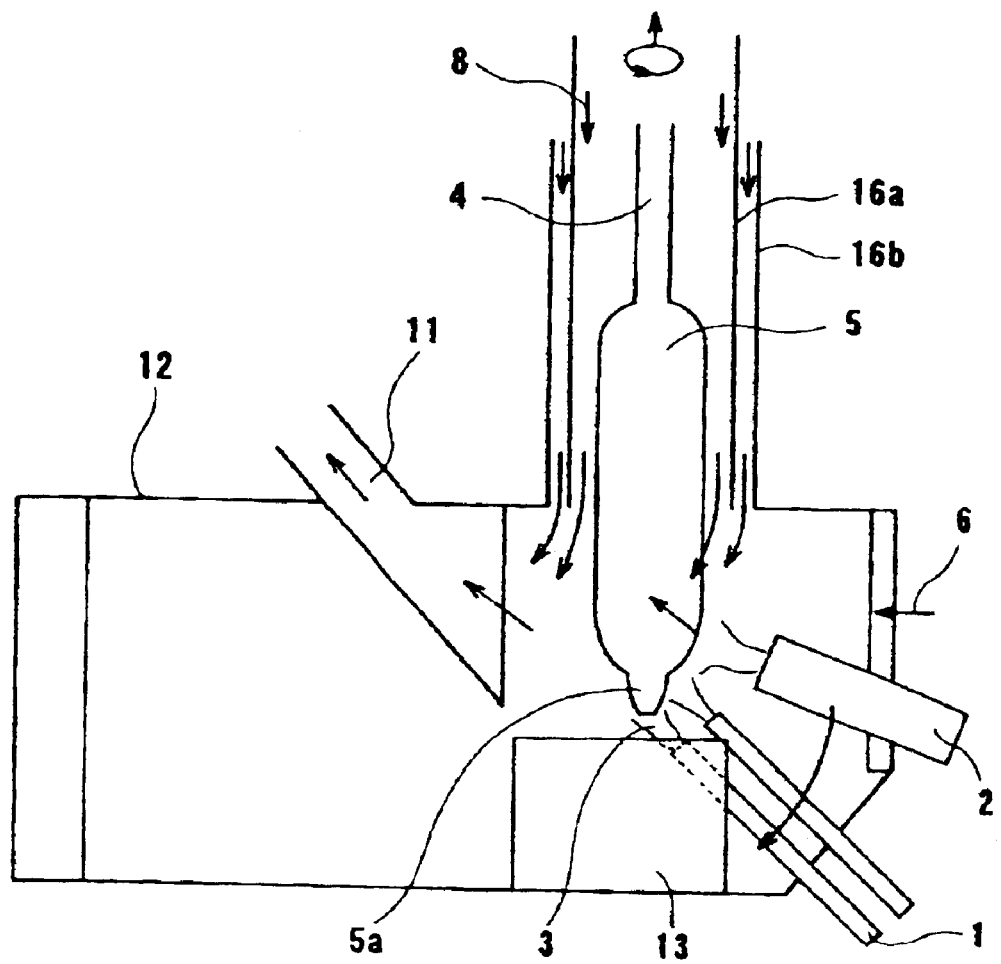
FIGS. 1(a) and 1(b) are schematic views for illustrating an embodiment of an apparatus for manufacturing an optical fiber soot according to the present invention.
Figure 1:
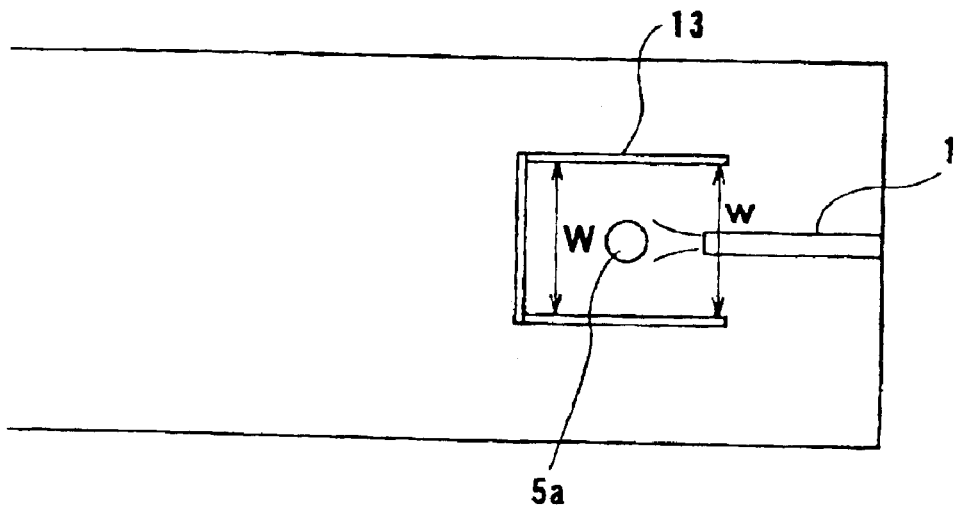
Figure 7:
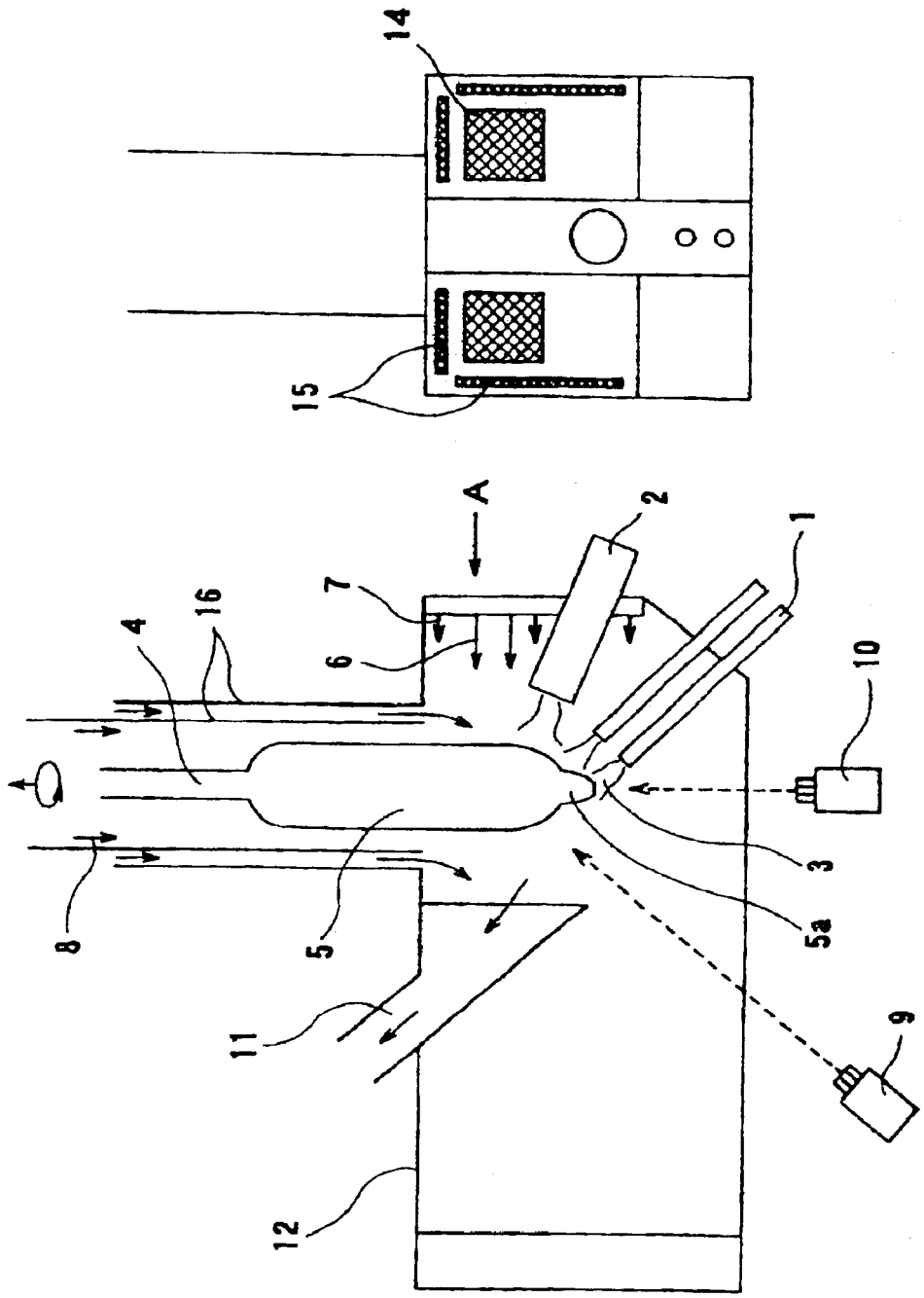
FIGS. 7(a) and 7(b) are schematic views for illustrating an apparatus for manufacturing an optical fiber soot according to conventional example.
Figure 8:
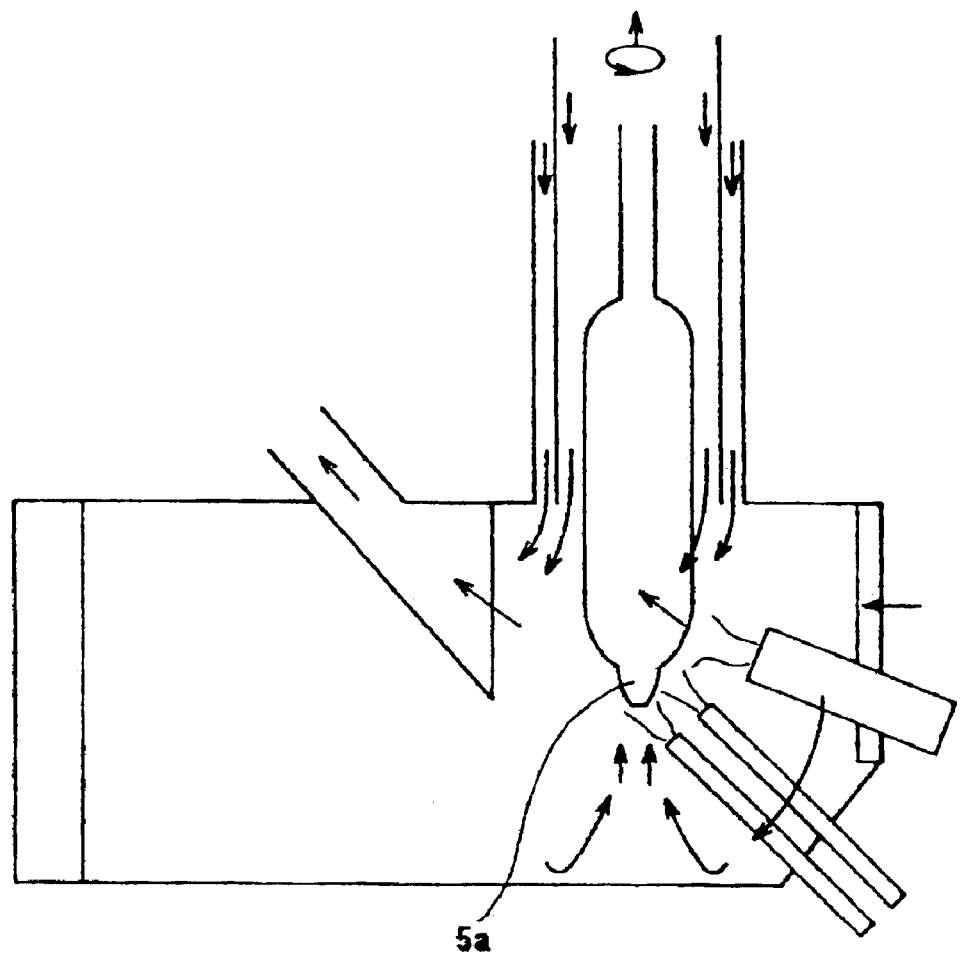
FIGS. 8(a) and 8(b) are views for explaining gas flow in an apparatus for manufacturing an optical fiber soot according to a conventional example.
Figure 8:
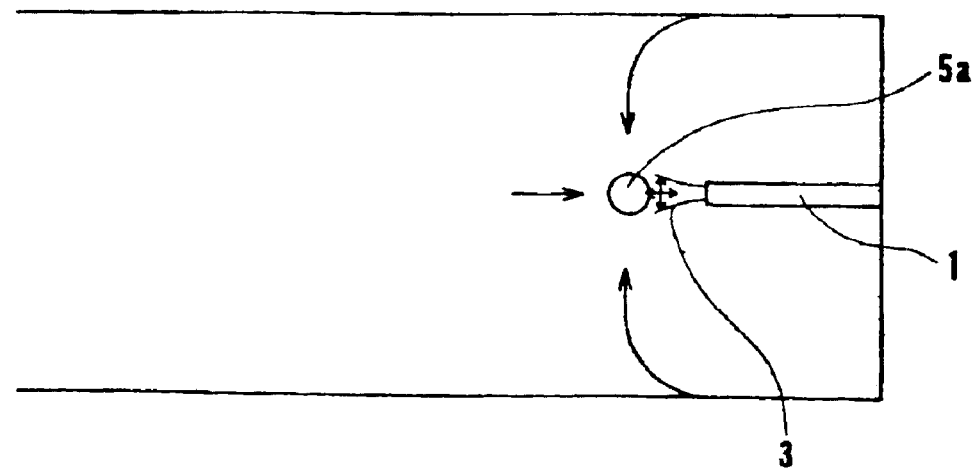

FIGS. 1(a) and 1(b) schematically illustrate the apparatus for manufacturing the optical fiber soot according to the present invention. FIG. 1(a) is a view seen from the front side of the apparatus for manufacturing and FIG. 1(b) is a view seen from a bottom. The apparatus for manufacturing the optical fiber soot shown in these drawings is basically the same as the apparatus for manufacturing the optical fiber soot shown in FIGS. 7(a) and 7(b), and the corresponding portions are indicated with the corresponding reference numerals. Hereinafter, only the essential portions in the apparatuses of this invention referring to numerals are shown in the drawing. (For example, a thermos viewer 9 or a radiation thermometer 10 are omitted and not shown in FIGS. 1(a) and 2(a).) Additionally, crossed-arrows depicted in the core flame 3 in FIG. 8(b), shows the flicker of the core flame.

In this embodiment, as shown in FIGS. 1(a) and 1(b), a reference numeral 12 denotes a heat-resistant reactor. Further, an air supplying tubular portion 16 is provided on an upper portion of the reactor and a pilot bar 4 is inserted in the interior of the reactor movably upward and downward and rotatably. According to this embodiment, the air supplying tubular portion 16 is a double tube containing an inner tube 16a and an outer tube 16b, however, it may be a single tube. Further, an air discharging pipe 11 is disposed on the upper portion of the reactor. In the same way as shown in FIGS. 7(a) and 7(b), an air inlets (for horizontal gas flow and for an air curtain flow) are opened on the side wall at the burner side. During forming the glass, the horizontal gas flow and the air curtain gas flow are formed from the air inlet side (hereinafter, the air inlet side is referred to as an upstream side) to the air discharging pipe side. Additionally, the descending air flow is formed from the side of the air supplying tubular portion 16 in the upper portion of the apparatus. The above described configuration is the same as that shown in FIGS. 7(a) and 7(b).

In this embodiment, the core partition 13 is arranged below the soot so as to surround the core burner with contacting the bottom surface of the reactor 12 and opening at the upstream side. (As described later in detail, the core partition has a height that is the same as the position of a tip of the core nozzle of the core burner. When there are two or more core burners, the core partition at least has a height that is the same as the position of a tip of the lowest core nozzle as shown in FIG. 1(a).) Therefore, the core partition enables to prevent the airflow from irregularly flowing from the side surface side, the upstream side and the bottom surface side of the reactor as well as the core partition rectifies the turbulence of the airflow within the reactor.

The core partition may have any shape of the transverse section, such as a anglar tube having shape as "⊐", that one surface of the core burner side of a square tube is an opening portion as shown in this embodiment, a cylindrical tube having an opening portion at the core burner side as shown in the following example, an anglar tube having a narrower opening portion at the core burner side, and a triangle tube such that one surface of the core burner side is an opening portion, so as to prevent the airflow flowing from the side surface side, the upstream side and the bottom surface side of the reactor. However, it is preferable that the core partition may have a shape having an opening portion at the core burner side.

A width W or a diameter D of the core partition may be appropriately set. The foregoing width W or a diameter D of the core partition may have any value as far as the air curtain flow is not prevented. W or D may have any value in the range of about ¾ of the width of the reactor or less to a thickness of the soot or more, and a width of expanded flame of the core burner or more. A width d of the opening portion at the core burner side of the core partition may have same or less as W or D. Preferably, the width d may be about 0.5 times to 0.8 times of W or D. The minimum width d may be about three times as long as a bore width b of the aperture of the core burner.

It is preferable that the height of the core partition is in the range between the height such that the tip of the nozzle of the core burner is hidden by the core partition and the height such that the tip of the core flame is hidden by the core partition. However, the horizontal gas flow flows far above from the tip of the core burner flame, so that it is possible to raise the height of the core partition to the extent such that the core partition does not prevent the flow of the horizontal gas. If the height of the core partition is lower than the tip of the nozzle of the core burner, the core partition is not capable of exerting the effect to prevent the airflow. Meanwhile, if it is raised to the extent such that the horizontal gas flow is prevented, the horizontal gas flow into the air discharging tube port is disordered, so that it accounts for arousing the flicker of the flame.

It is preferable that the core partition may rectify the airflow in the reactor.

Providing such a core partition enables the flicker of the core flame to be smaller during forming the glass, so that it is possible to stabilize the glass growth rate. As an index for checking the degree of the flicker of the core flame, the temperatures of the tip of the core during forming the glass were measured by a radiation thermometer and the degree were evaluated by their dispersion (standard deviation) of the temperature.

In the case that no core partition was arranged, the dispersion of the temperatures of the tip of the core was in the range of 5° C. to 8° C. However, in the case that the above described core partition is used, the dispersion was as narrow as the range of 2° C. or less. Additionally, in the former case according to the conventional technique, the variation width of the growth rate was about from 8 mm/h to 10 mm/h. However, in the latter case according to the present invention, the variation width was as narrow as 2 mm/h or less, so that the growth rate became remarkably stabilized.

Accordingly, in the case of using of the apparatus according to the present invention, the following problems, namely the temperatures of the tip of the optical fiber soot are inconstant, the density of the soot is decreased, and the cracks on the soot is generated, are prevented, so that it is possible to stably manufacture the optical fiber soot having a smaller fluctuation in a longitudinal direction, uniform in quality and high quality.

According to the apparatus of the present invention for manufacturing an optical fiber soot, it is possible to reduce a fraction defective in the step for manufacturing a porous optical fiber core soot according to a VAD method, and to manufacture the core soot more uniformly.

Namely, upon manufacturing the optical fiber soot by the VAD method, if the core partition is arranged in the periphery of the core burner flame, the airflow in the reactor is rectified and the disorder air flow toward the core flame is prevented, so that the flicker of the flame of the core burner can be made smaller and the growth rate can be also stabilized. Further, the temperatures of the tip of the core can be inconstant, the density of the tip of the core is not decreased, and that is also possible to prevent the cracks on the soot from being generated.

Additionally, according to the apparatus for manufacturing the optical fiber soot of the present invention, it is possible to efficiently manufacture the high quality optical fiber soot and to stably manufacture the optical fiber having a smaller fluctuation in a diameter of a longitudinal direction.

EXAMPLES

The present invention will be described in more detail based on the following examples 1 to 5 and a comparative example. However, the present invention is not meant to be limited by these examples.

Example 1

Figure 2:
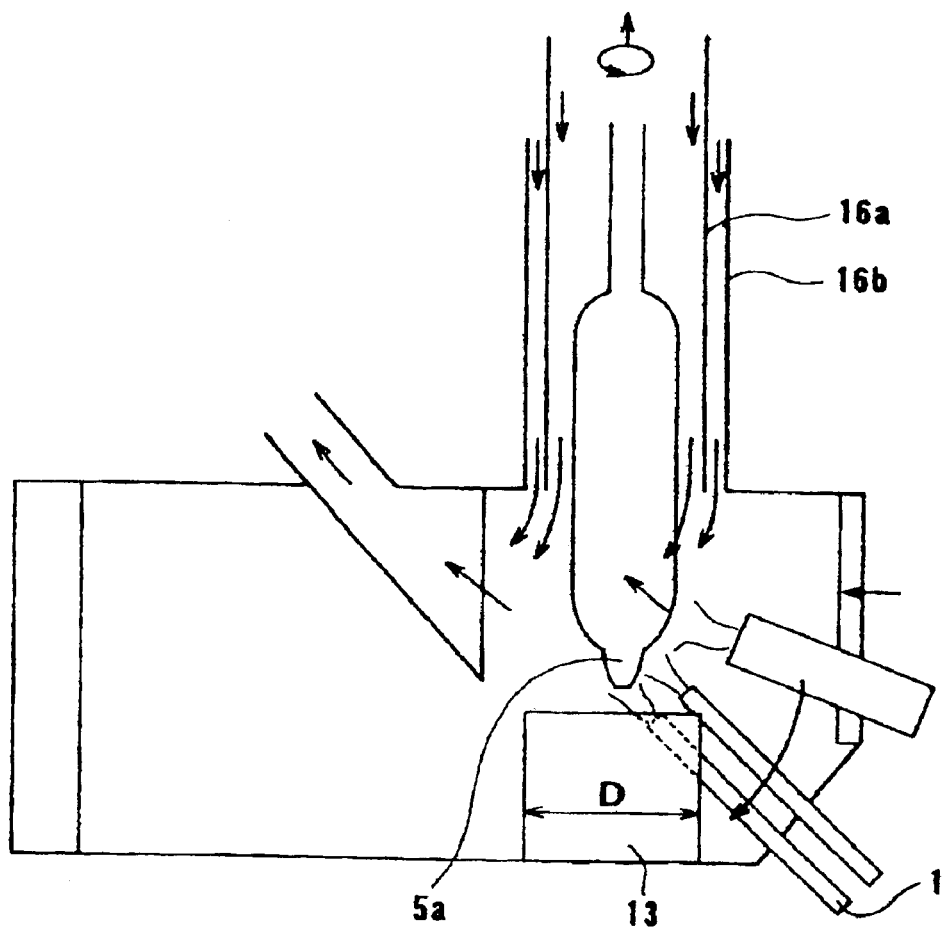
FIGS. 2(a) and 2(b) are schematic views of the apparatus illustrating a first example according to the present invention.
Figure 2:
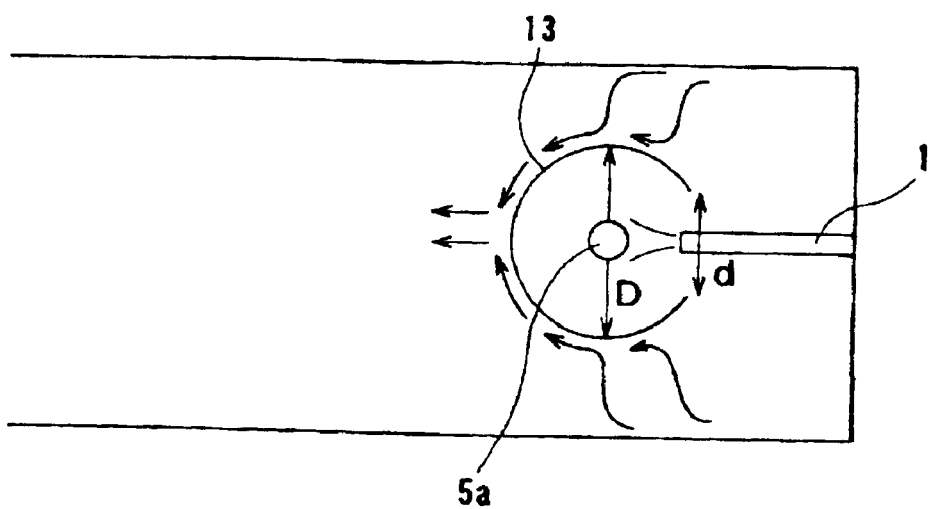

The first example of the present invention will be explained by using schematic views of FIGS. 2(a) and 2(b) showing the apparatus for manufacturing according to this example from a front side and a bottom side. The core partition was formed in a cylindrical shape. An opening portion d, in which the core burner was inserted, was made as d=0.7 D with respect to a diameter D. The degree of the flicker of the core flame in this case was evaluated by the dispersion (standard deviation) of the temperatures of the tip of the core as described above.

In the case that the core partition was not arranged according to a conventional apparatus, the dispersion of the temperatures of the tip of the core was in the range of 6° C. to 7° C. However, in the case that this core partition was used according to the present invention, its dispersion was as narrow as the range of 1° C. or less. Additionally, in the case of a conventional apparatus, the fluctuation of the growth rate was in the range of 8 mm/h to 9 mm/h. However, in the case of the present invention, the variation width was as narrow as the range of 2 mm/h or less, so that it became possible to manufacture the optical fiber very stably.

As a result of variously changing the width d of the opening portion of the apparatus in the present invention to be carried out, it was found that the width d was particularly preferably made as 0.5 D<d<0.8 D.

Example 2

Figure 3:
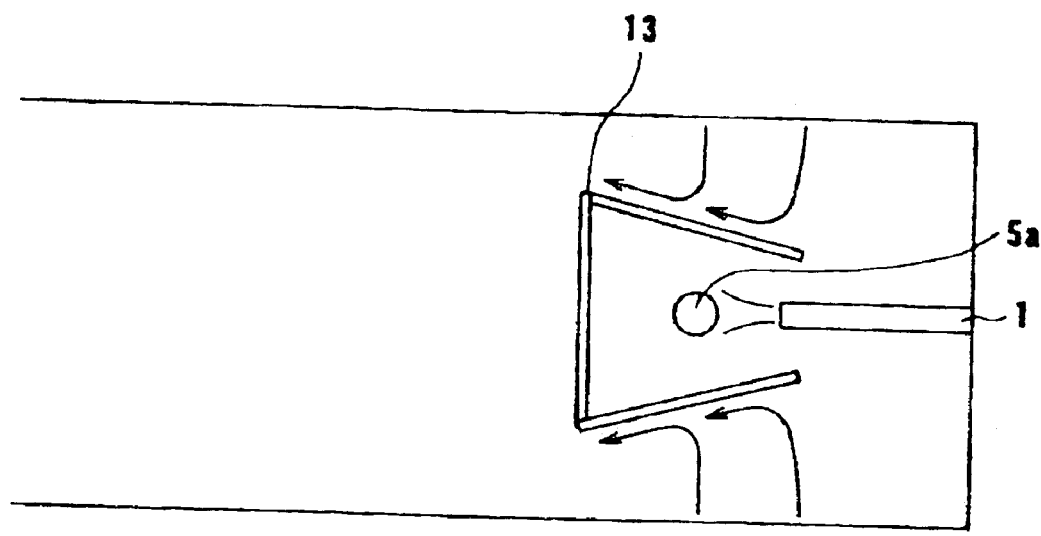
FIG. 3 is a schematic view for illustrating a core partition portion of the apparatus according to a second example according to the present invention.

The second example of the present invention will be explained by using a schematic view of FIG. 3 showing the apparatus for manufacturing according to this example seen from a bottom side. The front view of the apparatus for manufacturing according to this example is identical with FIG. 1(a) and FIG. 2(a), so that it is herein omitted. In this example, the width of the opening portion at the side, in which the core burner was inserted, on the core partition was narrower compared to the width of the opening portion shown in FIGS. 1(a) and 1(b). In this example, the same excellent effect as that of the example 1 was obtained. Further, in this example, the flicker of the core flame was smaller, so that the tip of the soot was evenly heated. Therefore it was possible to prevent the density of the soot from being decreased. It is more preferable that the width of the opening portion of this core partition is changeable.

Example 3

Figure 4:
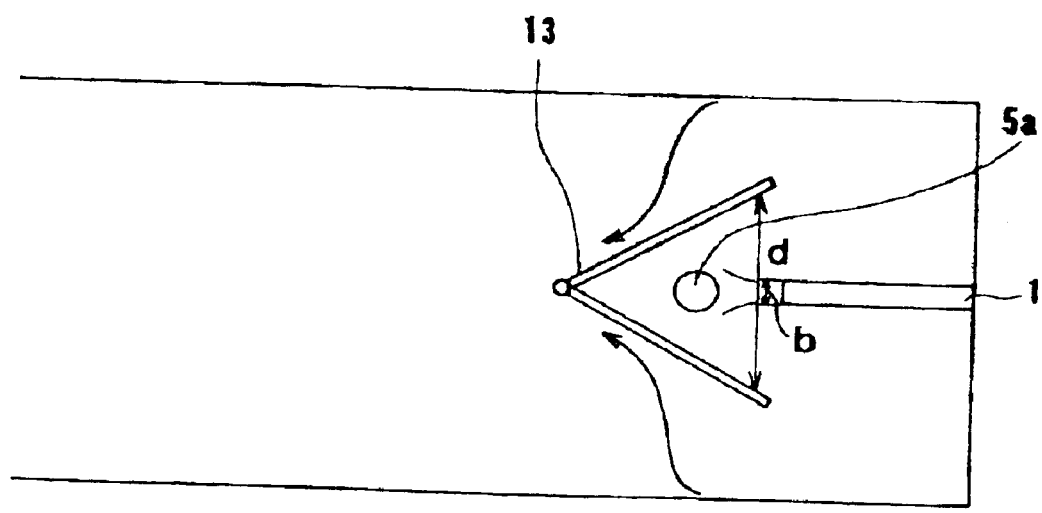
FIG. 4 is a schematic view for illustrating a core partition portion of the apparatus according to a third example according to the present invention.

As illustrated by a schematic view showing the apparatus of the third example from the bottom side in FIG. 4, the shape of the core partition on the apparatus according to this example was a triangle tube such that one surface of the core burner side is an opening portion. The width d of the opening portion, in which the core burner is inserted, was capable of being arbitrary changed. As one embodiment of this example, the glass was formed when the width d is ten times as long as the bore width b of the aperture of the core burner. In this case, the flicker of the core flame is the same excellent level as that of the Example 1 and the Example 2.

Example 4

Figure 5:
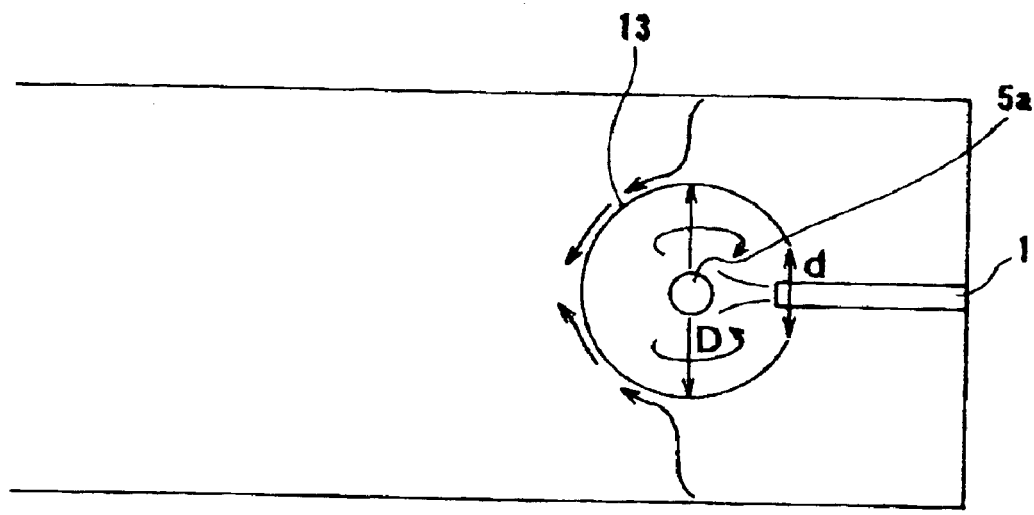
FIG. 5 is a schematic view for illustrating a core partition portion of the apparatus according to a fourth example according to the present invention.

As illustrated in FIG. 5, the shape of the core partition of the apparatus according to the fourth example was a cylindrical shape as same as the Example 1 and the width d of its opening portion was less than 0.5 D. A forming of a glass was carried out by using the apparatus having the core partition of the above shape. As a result, it was possible to prevent the airflow flowing from the side surface side and the downstream side of the reactor. However, the ascending airflow generated by the core flame was retained in the interior of the core partition. Therefore, compared to the Example 1, the core flame was not so stable.

Example 5

Figure 6:
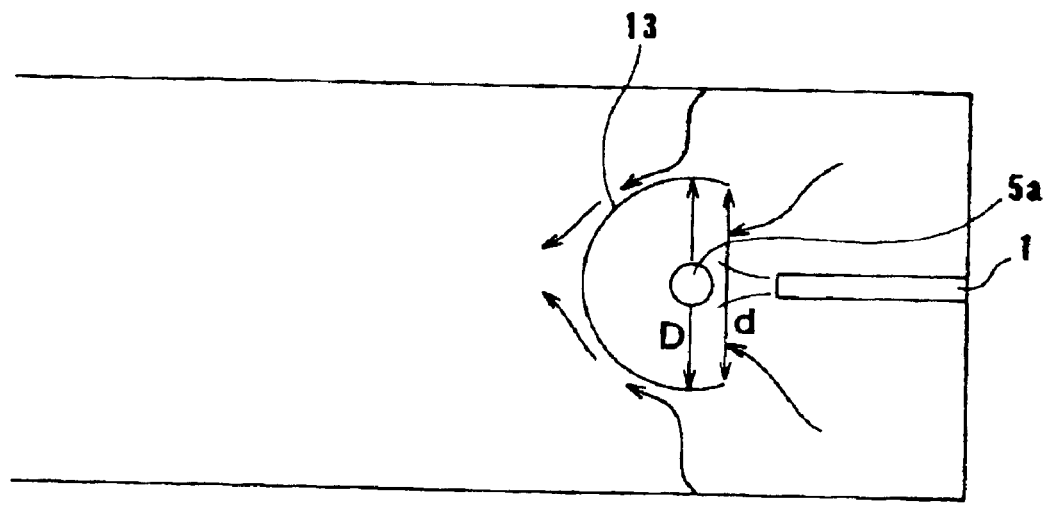
FIG. 6 is a schematic view for illustrating a core partition portion of the apparatus according to a fifth example according to the present invention.

As illustrated in FIG. 6, the shape of the core partition of the apparatus according to the fifth example was a cylindrical shape as same as the Example 1 and the width d of its opening portion was less than 0.9 D. In the case of forming the glass by using the apparatus having the core partition of the above shape, it was possible to prevent the airflow flowing from the downstream side in the reactor. However, it was not possible to prevent the airflow from flowing from the side surface side of the reactor. Therefore, compared to the Example 1, the core flame was not so stable.

Comparative Example

The glass was formed in the reactor in which the core partition was not arranged. In this case, the flicker of the core flame became larger and the dispersion on the temperature of the tip of the core was in the range of 5° C. during forming the glass and further, the fluctuation of the growth rate became 8 mm/h compare to the case of the present invention. Additionally, the temperature of the tip of the core was inconstant and the density of the soot was lower, so that the cracks were generated at the tip of the core and it was not possible to manufacture a good quality glass fiber.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A method for manufacturing an optical fiber soot using an apparatus having a core burner and a core partition in a reactor, comprising steps of:

executing a Vapor-phase axial deposition process in the reactor wherein the core partition is provided on a periphery of said core burner, a bottom of the core partition contacts a bottom surface of the reactor, and the core partition is configured to enable a flicker of a flame of the core burner to be reduced.

2. The method according to claim 1, wherein said core partition has an opening portion at said core burner side.

3. The method according to claim 2, wherein a width of the opening portion of the core partition is smaller than a width of the core partition itself.

4. The method according to claim 2, wherein the width of the opening portion of the core partition w(d) has a value satisfying: 0.5W(D)<w(d)<0.8W(D) to the width W or the diameter D of the core partition.

5. The method according to claim 2, wherein the width of the opening portion of the core partition w(d) is changeable.

6. The method according to claim 2, wherein the width of the opening portion of the core partition w(d) is about ten times a diameter of the core burner b.

7. The method according to claim 1, wherein the core partition has a cylindrical shape having a diameter not less than a diameter of the optical fiber soot.

8. The method according to claim 1, wherein the core partition at least has a height that is same as a position of the core burner.

9. The method according to claim 1, wherein the core partition is provided below the optical fiber soot.

10. The method according to claim 1, wherein the core partition rectifies an airflow in the reactor.

* * * * *